US009832233B2

(12) United States Patent
Torgersrud et al.

(10) Patent No.: US 9,832,233 B2
(45) Date of Patent: *Nov. 28, 2017

(54) SECURE SOCIAL NETWORK

(71) Applicant: Intelmate LLC, San Francisco, CA (US)

(72) Inventors: Richard Torgersrud, San Francisco, CA (US); Grant Gongaware, San Francisco, CA (US); Morgan Collins, San Francisco, CA (US)

(73) Assignee: INTELMATE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,806

(22) Filed: Sep. 12, 2016

(65) Prior Publication Data

US 2016/0381083 A1    Dec. 29, 2016

Related U.S. Application Data

(63) Continuation of application No. 13/438,940, filed on Apr. 4, 2012, now Pat. No. 9,443,070.

(51) Int. Cl.

| G06F 15/16 | (2006.01) |
| H04L 29/06 | (2006.01) |
| G06Q 50/00 | (2012.01) |
| G06Q 10/10 | (2012.01) |
| G06Q 50/22 | (2012.01) |
| G06F 21/32 | (2013.01) |

(Continued)

(52) U.S. Cl.
CPC ........ *H04L 63/30* (2013.01); *G06F 17/30864* (2013.01); *G06F 17/30991* (2013.01); *G06F 21/32* (2013.01); *G06Q 10/10* (2013.01); *G06Q 50/01* (2013.01); *G06Q 50/22* (2013.01); *H04L 51/32* (2013.01)

(58) Field of Classification Search
CPC ...................................................... H04L 63/30
USPC ........................................................ 709/204
See application file for complete search history.

(56) References Cited

U.S. PATENT DOCUMENTS

| 5,710,900 A | * 1/1998 | Anand | ............. G06F 17/30592 |
| | | | 707/999.003 |
| 6,668,045 B1 | 12/2003 | Mow | |
| | (Continued) | | |

FOREIGN PATENT DOCUMENTS

CA    2639360 A1    3/2009

OTHER PUBLICATIONS

Prison Inmates Online, http://prisonmates.com, Publication Date: Aug. 29, 2011.

(Continued)

*Primary Examiner* — Kevin Bates
*Assistant Examiner* — Emad Siddiqi
(74) *Attorney, Agent, or Firm* — Venable LLP; Jeffri A. Kaminski

(57) ABSTRACT

Systems and methods for facilitating and securing the exchange of digital information between individuals within the social network of a person or group of people who are subject to security or law enforcement limitations or otherwise reside within a controlled or correctional facility. All submitted information requires administrative approval, either by a human administrator or an automated process, before it can be viewed by other members of the social network.

20 Claims, 12 Drawing Sheets

(51) Int. Cl.
*G06F 17/30* (2006.01)
*H04L 12/58* (2006.01)

(56) References Cited

U.S. PATENT DOCUMENTS

| | | | |
|---|---|---|---|
| 7,502,451 B2 | 3/2009 | Gyllenskog et al. | |
| 7,519,375 B2 | 4/2009 | Polozola et al. | |
| 7,742,581 B2 | 6/2010 | Hodge et al. | |
| 7,742,582 B2* | 6/2010 | Harper | G06Q 20/382 |
| | | | 379/100.08 |
| 7,804,941 B2 | 9/2010 | Keiser et al. | |
| 7,965,309 B2 | 6/2011 | Mattila et al. | |
| 8,019,354 B2 | 9/2011 | Rae et al. | |
| 8,370,206 B2 | 2/2013 | Collins | |
| 2002/0007453 A1 | 1/2002 | Nemovicher | |
| 2003/0028665 A1 | 2/2003 | McAllister et al. | |
| 2006/0190985 A1* | 8/2006 | Vasishth | G06F 21/604 |
| | | | 726/1 |
| 2008/0068447 A1 | 3/2008 | Mattila | |
| 2009/0076832 A1 | 3/2009 | Collins et al. | |
| 2009/0177626 A1 | 7/2009 | Lottero | |
| 2010/0112540 A1 | 5/2010 | Gross et al. | |
| 2010/0125632 A1* | 5/2010 | Leonard | G06Q 10/10 |
| | | | 709/204 |
| 2010/0299761 A1* | 11/2010 | Shapiro | G06Q 10/107 |
| | | | 726/28 |
| 2010/0318441 A1 | 12/2010 | Harper | |
| 2011/0106894 A1 | 5/2011 | Hodge et al. | |
| 2011/0209192 A1* | 8/2011 | LeClerc Greer | G06F 21/32 |
| | | | 726/1 |
| 2013/0054012 A1 | 2/2013 | Holman et al. | |
| 2013/0159123 A1* | 6/2013 | Hochberg | G06Q 30/06 |
| | | | 705/26.1 |

OTHER PUBLICATIONS

TRULINCS FAQs, Federal Bureau of Prisons (BOP) retrieved from hhttp://www.bop.gov/inmate_programs/trulins_faq, jsp#1 on Feb. 13, 2012.

Corpora, Mark, for Computer Use in Prisons, retrieved from astro.temple.edu/~tub980819/corporaCISpower.pptx on Feb. 13, 2012.

Lappin, Harley, TRULINCS—Federal Bureau of Prisons Email System, Sep. 19, 2006, retrieved from http://www.lexria.com/TRULINCS.htm on Feb. 13, 2012.

\* cited by examiner

SECURE SOCIAL NETWORK

CROSS-REFERENCE OF RELATED APPLICATION

This application is a continuation of U.S. patent application Ser. No. 13/438,940, filed Apr. 4, 2012, the disclosure of which is hereby incorporated by reference in its entirety.

FIELD OF THE INVENTION

Embodiments described herein relate generally to the sharing of user generated content, and more specifically to social networks in which one or more participants are subject to special security or law enforcement limitations or otherwise reside within a controlled environment, such as a detention facility (i.e., detainees).

BACKGROUND OF THE INVENTION

In a conventional system for communication with incarcerated, detained or controlled individuals, communications between individuals inside, or subject to, the controls of a controlled environment, such as a detention facility, detention environment, jail or secure psychiatric ward, and those outside the facility are generally conducted in real time using a telephone, in person visitation, and more recently video (also known as video visitation), or in a slower manner using postal mail. All of these means of communication are generally one-to-one in nature, and do not facilitate the sharing of user generated content with more than a single intended recipient. Additionally, traditional mail can result in safety concerns and breaches, such as the inclusion of contraband or other dangerous materials within the mailed item. Also, other than traditional mail, very few means currently exist for concurrent communication between individuals who may not be able to communicate in real time. Without applying electronic social network systems in the controlled environment space, such individuals will continue to be unable to share content beyond the one-on-one experience, or hold prompt communications without being available at the same time as the communication recipient. However, permitting access by detainees, or others subject to the controlled environment, to electronic social network systems as they exist today presents particular safety and security concerns not otherwise addressed by the current systems and methods.

In a conventional communications system using an electronic social network, users determine what content to post, submit or share and may also determine with whom to share the content. For a detainee or other individual who is incarcerated or otherwise subject to special rules or restrictions, allowing this type of control over one's own content and/or message recipient would violate the controlled environment's rules, which prohibit communication with a person in violation of an order or with a witness, or the sharing of information in furtherance of a crime. Therefore, as the current systems and methods do not provide individualized review and administrative oversight to ensure adherence to such rules, these individuals have been prohibited from such access.

SUMMARY

In one form, the present disclosure provides a method for facilitating the exchange or transmission of information between members of a social network in which at least one member is subject to limitations of a controlled facility including the steps of receiving content in an electronic form from a member for display to members or intended members of the social network; evaluating the received content to determine if it is appropriate for display to the members or intended members of the social network; allowing the received content to be viewed by the members or intended members of the social network only if it is deemed appropriate for display in the evaluating step; and recording data relative to one or more of the receiving, evaluating, and allowing steps.

In another form, the present disclosure provides a system for facilitating the exchange or transmission of information between members of a social network in which at least one member is subject to limitations of a controlled facility including a data receiving module configured to receive content in an electronic form from a user for display to members or intended members of the social network; an evaluation module configured to evaluate the received content and determine if it is appropriate for display to the members or intended members of the social network; a content dissemination module configured to provide received content that is deemed appropriate by the evaluation module to the members or intended members of the social network for viewing; and a data recording module configured to record data relative to the actions of one or more of the data receiving module, the evaluation module, and the content dissemination module.

BRIEF DESCRIPTION OF THE DRAWINGS

FIG. 7 illustrates an example of an administrative screen used in reviewing a user's photos.

FIG. 11 illustrates an example of user's interface when searching for potential contacts.

DETAILED DESCRIPTION OF THE INVENTION

Figure 1:
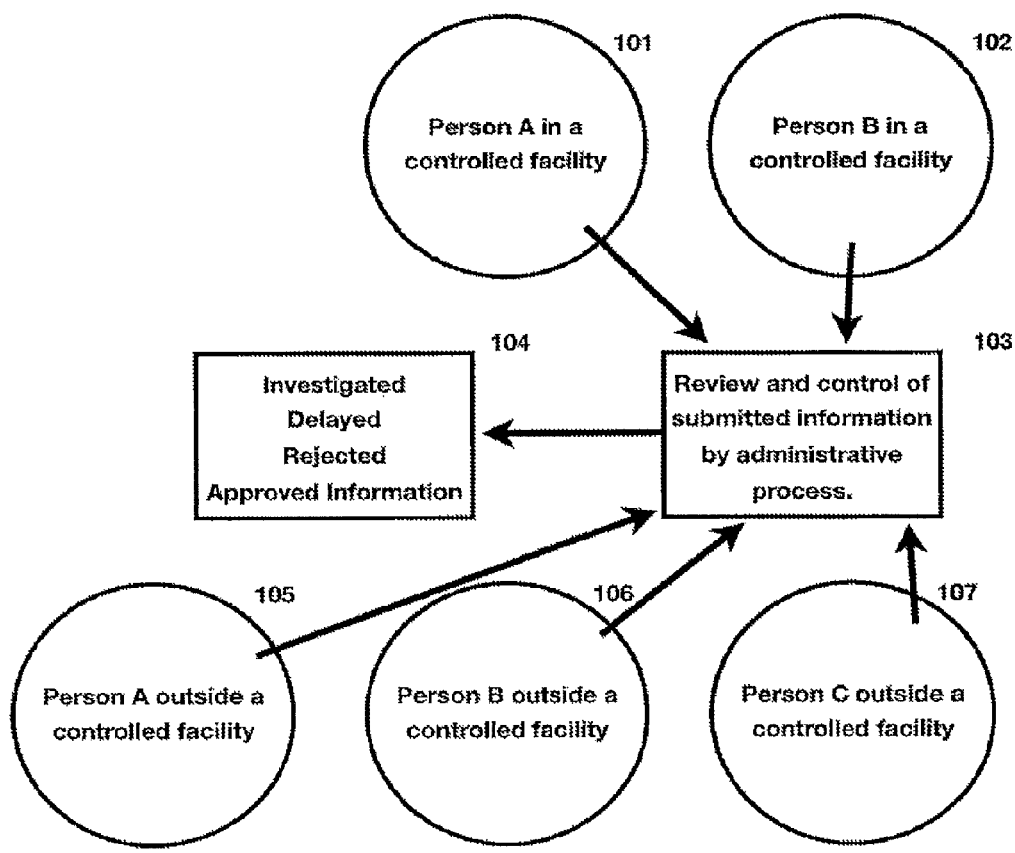
FIG. 1 illustrates the flow of content in the submission process.

Embodiments of the invention relate to a method and system of facilitating and securing the exchange or transmission of information between two or more parties in which at least one of those parties is subject to special security or law enforcement limitations or otherwise resides in, or is subject to the controls of a controlled facility (also referred to as detention environment) and one or more participating parties may be similarly subject to special security law enforcement limitations or otherwise reside in a controlled facility or may not reside in a detention environment, such as friends of the detainee, family members, co-workers, medical personnel, counselors, faith leaders. Exchanged or transmitted information may be member generated, such as a photo or a video message, or it may be member-curated, such as a news headline, a famous quote, or a sports score.

A controlled environment or controlled facility is an environment or facility in which individuals are confined or otherwise subject to supervision. This includes, but is not limited to, detention facilities, prisons, secure hospitals, and secure addiction treatment facilities. Administrators who are associated with a controlled environment may separately be administrators as well as members of the social network.

A group of individuals organized to transmit or exchange member-generated (or member-curated) content is referred to herein as a "social network." Members of a social network may elect to exchange information with or transmit information to all participants within the social network, a minority of participants, or a group that encompasses other participants plus others that may be connected by second or subsequent degree links (such as e.g., friends of friends). Exchange with or among second or subsequent degree members may also be denied, limited or restricted for safety and security reasons.

Social network members may be required to authenticate themselves in order to verify their identity. This identification may include one or more of the following: user name, password, voiceprint authentication, face verification, identifying body marks and features verification, retina verification, and palm or fingerprint verification. There may be a need, from time-to-time, for administrators to require participants to re-enroll in the authentication process. For example, a user who has visibly aged may be required to re-enroll in a face verification process to ensure an updated image is used for comparison.

Because one or more of the individuals participating in this information exchange resides in or is subject to a detention environment, there is a need for facility staff, or those working with a facility (generically referred to as administrators), to control which participants may communicate with other participants and/or what information is or may be exchanged among various participants or within the system generally. Additionally, an automated process may be used to supplement or replace the human review of submitted information or other requested actions. For example, an administrator may wish to prevent an incarcerated gang member from communicating with a former cohort who is not incarcerated. Also, an administrator may edit, redact, delay or block submitted content, such as a facility guard's shift schedule or an image depicting a guard, from one or more parties participating in the social network. Also, an automated process may redact or block submissions containing offensive or other classified words.

The process of administrative review of user submitted content is shown in FIG. 1. One or more users 105, 106, 107 outside of a secured facility or users 101, 102 within a secured or controlled facility submit digital information with the intent to share it with others in their social network. Before members of the social network are allowed to see the submitted content, it must first be approved. All information from the users 101, 102, 105, 106, 107 first flows into an administrative review process 103. The administrative review process 103 may include content control, such as the approval, denial, or partial approval (i.e., redaction) of submitted information. The administrative review process 103 classifies the submitted content and can have a number of results as seen at block 104. For example, submitted content can be approved, rejected, investigated, delayed, redacted or partially approved. Typically the administrative review process 103 does not include editing (aside from redaction), but to the extent that it does, a record is kept of all such edits including the time of the edits, the identity of the administrator responsible for the edits, and the content both before and after editing.

Administrative control may also include the blocking or removal of participants from a social network such as for example, the removal of a known drug dealer from the social network of a drug user who is residing in a secure facility. This control can also include control over the formation of social networks. In this instance, each new member wanting to join a social network or each new request for someone to join an existing social network may be subject to administrative approval. In such a case, only after a new connection has been approved can that individual join the given social network and view submitted content from the members of the social network. Administrators can also penalize members by suspending access privileges, blocking access to certain members or content, or by otherwise restricting their use of the system.

Administrators may also use lists to control the membership in social networks. For instance, some members may be controlled under a no-contact or black-list regime. For these members, contact is generally allowed except for a specific list of individuals with whom contact is prohibited. Thus, most people would be free to join these members' social network, but a limited list of individuals would not be allowed to have contact with these members and therefore would not be allowed to join their social network. A more restrictive regime can be used for members requiring additional security. This regime is sometimes called a white-list. Members subject to the white-list regime are only allowed contact with individuals on a defined contact list. Thus, unlike the black-list regime, where contact is the default with minimal restrictions, under the white-list regime the default is no contact except for those individuals specifically listed. For example a user under white list restriction may be limited to having contact with his attorney and a few family members that are each included on the approved contact list.

Once information has been reviewed, the information that is permitted by the administrative process is then made available to be viewed by members of the social network. Members of the social network that wish to review shared information are able to review their own submitted information (if and when the content is permitted by administrative process) and the information submitted by others in their social network that has been permitted by the administrative process.

Figure 2:
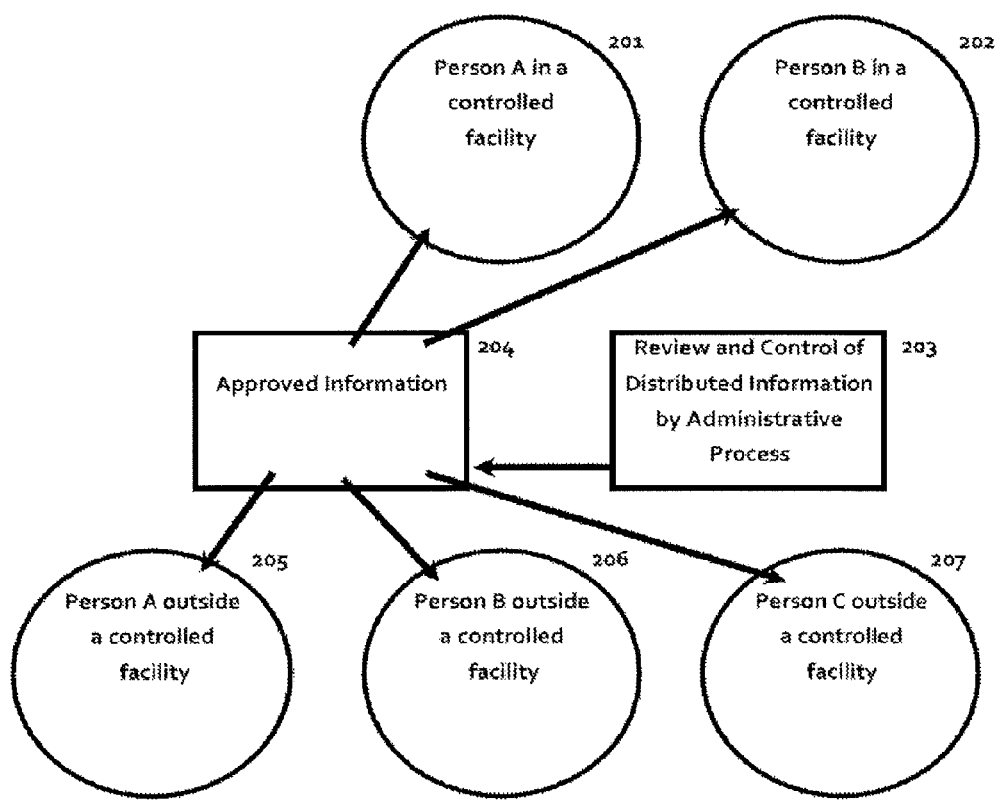
FIG. 2 illustrates the dissemination of content upon approval.

FIG. 2 shows how approved information 204) which is a result of the review and evaluation process 203, from individuals 201, 202 within a secure facility and from individuals 205, 206, 207 outside of a secure facility can be viewed by members of the social network. Social network members may be required to login or otherwise verify their identity to access data. When first setting up an account with system, the user may be required to provide certain information or biometric data. This allows administrators to later verify the identity of a member by requiring specific information or recollecting biometric data and comparing it to data associated with the member's account.

Submitted information may be presented to the social network participants as a list or structure sorted in a logical manner, such as chronologically, alphabetically, by submitting person, or by information type. The user may wish to further filter the sort, such as listing information submitted by a single person or timeframe, for example.

Social network users may submit information that is self-descriptive, and this information is used to create or augment a profile of the user. Profile information may include submitted or collected data such as the user's name, location, gender, astrological sign, hobbies, or favorite foods. This information may be searchable by other users, allowing a user to search for a male who likes to read, for example.

Information submitted by social network members may include member-generated content, such as photos, personal videos, notes or member-curated content, such as a news headline, a famous quote, or sports scores. The submission and review of information may be done with any digital-enabled device, such as a desktop computer, laptop, tablet, mobile device, or kiosk. This information may be searchable by other members and administrators. Additionally, it is possible to allow other outside parties access to the system. These parties may include other law enforcement agencies or third party investigators. These parties may, for instance, use the system to further ongoing investigations or to provide evidence of contact between certain individuals. This access may be provided free of charge or for a fee depending upon the identity of the third party and the reason for which the party wishes to access the system.

Submitted information may include video messages, such as video of a friend or family member wishing other social network participants a happy new year, or images that could be submitted for individual display, or display as a gallery, such as a series of photos from a birthday party. The digital video and images may be submitted via an online file upload process, or submitted directly from an image collection apparatus attached, connected to, integrated with or built into the device being used, such as a laptop, mobile device or kiosk arrangement. Submitted information may also include text, which may be searchable by members with permission, administrators, or third parties, as discussed above. A member wishing to view submitted content related to Halloween, for example, can search for related words and access the results or a list of results matching the search criteria. Users may also wish to submit content directly related to information previously submitted in the form of a comment or text note. For example, one user may submit information such as a photograph of a birthday cake, and another user may submit a comment such as "Happy Birthday."

All content is capable of being searched. Members can search for any content that has been submitted and approved for access. As discussed in more detail below, members can also search for other members as potential contacts. This way, the system can facilitate dating, professional networking, pen pal matching and other functions. Administrators can similarly search approved content, and can also search content that was rejected, redacted, edited, or subject to any other additional limitations as part of the administrative review process. Administrators can also grant third parties access to either member level searching or administrator level searching. As discussed in more detail below, the system logs information for each transaction and is capable of generating reports of the logged data.

The system can also facilitate real time video or text messaging. In this instance the administrative review process would allow a real time transmission to be initiated, starting a video visitation or instant messaging session. The system would continue to record the content of the communication, and make it available for real time monitoring, but each individual transaction would not be subject to administrative approval review given the real time nature of the communication.

The system may be run on a commercial basis, with payment required for some level of usage by social network participants. Payment models may include subscription for unlimited use, limited use, a pay-per-submission type model, payment for a fixed number of submissions, views or accesses, or payment for the time spent submitting, viewing or accessing information in the system.

Administrators may wish to review summary information regarding actions within the system described here, such as a report showing the total number of submissions by each social network participant, or in a given timeframe, or a total number of submissions blocked or redacted by administrative process, or a list of administrative actions performed by any one administrator or automated process. To support this desire for summary reports, the system may require the logging of some or all activities by social network participants and administrators. Logging is the recording of activities by social network participants and administrators. The intent of logs is to analyze activities for the purpose of creating reports or diagnosing issues.

One advantage of the system disclosed herein may be a decrease in or the complete elimination of traditional mail service for detained or controlled individuals. As mentioned above, traditional mail presents security risks because hazardous materials, such as anthrax, or contraband materials, such as drugs etc., may be introduced. Because of these concerns traditional mail requires more effort to inspect and presents a greater risk to the staff and administrators of the controlled environment than communications provided by the current invention. The invention may be able to decrease or eliminate the need for traditional mail and in doing so may decrease or eliminate the risks associated with handling traditional mail and save precious facility resources.

Embodiments may be implemented using computer hardware or software, or a combination of both. Computer software implementing features of the embodiments may be stored as instructions on a tangible computer readable medium. References to the "system" or "platform" describe specific embodiments and do not limit the scope of the claimed invention. Embodiments may also be implemented as web pages or software applications, including applications for mobile devices, with internet communication capabilities. Embodiments may be implemented on or used in conjunction with centralized or distributed systems. For example embodiments may be implemented on or used in conjunction with the systems shown in U.S. patent applications Ser. No. 12/826,153 (Central Call Platform), Ser. No. 12/826,168 (Consolidated Voicemail Platform) and Ser. No. 13/088,883 (Interactive Audio/Visual System and Device for use in a Secure Facility), each of which is hereby incorporated by reference.

Though embodiments are described with reference to facilities such as prisons or detention facilities, the embodiments described herein could be used in any facility requiring secure flow of social information. While embodiments are described as stand alone systems or methods, the embodiments described herein could also be used to provide secure access to existing social networks. In this instance, the embodiments would serve as a firewall, restricting access, and requiring appropriate approval of all information flowing into or out of the controlled facility. Embodiments can also be configured to cooperate with existing systems that combine social networks to provide convenient user interactivity.

Embodiments are also configured such that upon being released from a controlled facility, for instance due to parole, or upon being released from other forms of supervision or control, a member can maintain his/her account with a new status. Upon a member's release, administrators can establish new rules for the previously detained individual. This allows the previously detained individual to continue his/her use of the system after being released and facilitates the continuity of data for administrative purposes.

Figure 3:
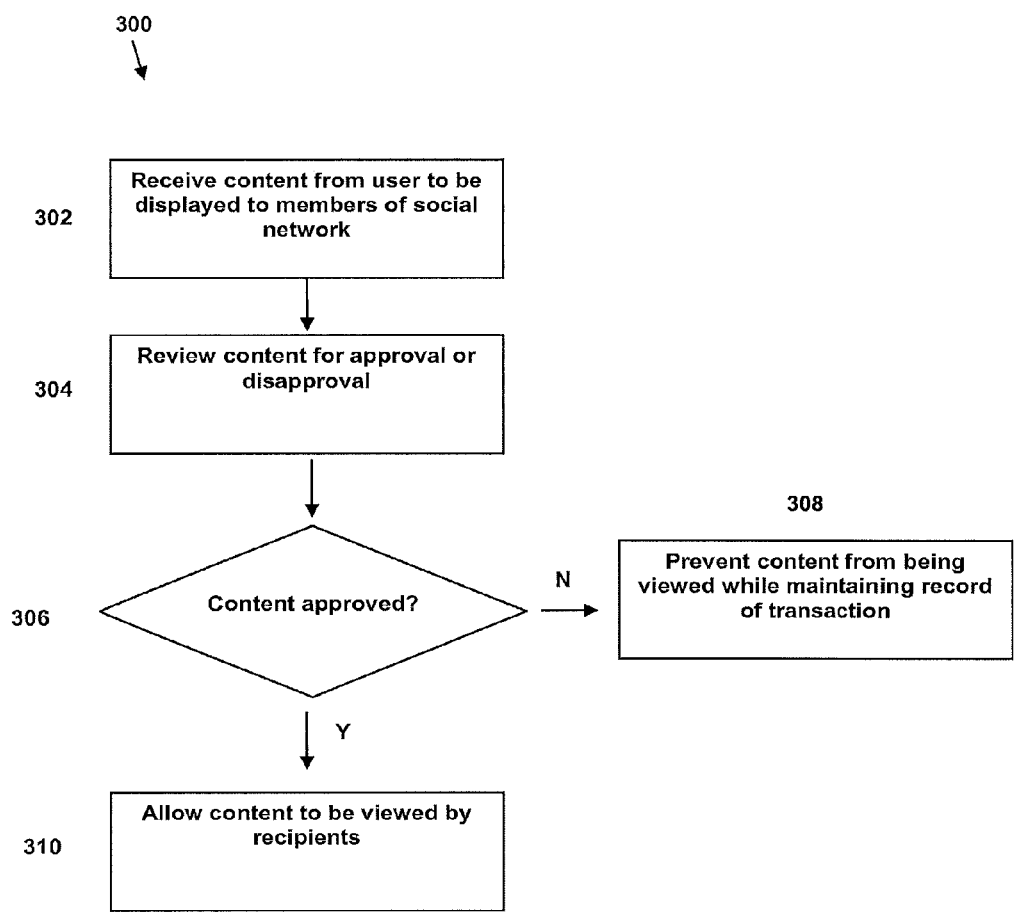
FIG. 3 illustrates the process flow associated with an embodiment of the invention.

It should be understood that embodiments of the invention are not limited by the example embodiments described herein and that changes can be made thereto. Example embodiments are now described with reference to the accompanying figures wherein like reference numbers are used consistently for like features throughout the drawings, FIG. 3 shows the process 300 by which content is submitted, reviewed, and eventually either made available to social network members or not made available to social network members. At step 302 content is received from users who wish to share the content with members of the social network. Step 302 corresponds to the flow of information from users 101, 102, 105, 106 and 107 into process 103 in FIG. 1. The received content is then reviewed at step 304. As discussed above, the review process can be carried out by a human administrator, an automated process, or a combination of the two. Facility staff have great flexibility in configuring the review process. For instance, review criteria and procedures can be set based on the identity of the member, the type of information to be shared, the direction of information flow, the time of day or any other criteria. Tiered monitoring is also possible. For instance, content provided by users 101 and 102 within the controlled facility could be subject to human review and approval while content submitted by users 105, 106, 107 outside the controlled facility may only require automated approval.

At step 306 it is determined whether content has been approved or rejected. If content has been approved, it is made available to the intended recipients at step 310. If however, content has been rejected, the intended recipients are not permitted to view the content (as shown at step 308). In addition to outright approval or rejection, the review process (step 304) can result in other outcomes including further investigation, delaying of processing or of making available, redaction, partial approval or limited viewing by some but not all intended recipients as discussed previously.

Information is logged and retained throughout the entire process 300 for later review and retrieval. The logging occurs regardless of the outcome of the review such that approved and rejected content transactions are both logged by the system. With respect to a submission of content at step 302, the system logs who submitted the content, a date and time of the submission, the intended recipients, the gallery destination (if the content is an image or video for inclusion in a gallery of such content), the substance of the shared content (the actual text, image, video, etc. that is to be shared), and any file names associated with the content. At the review step 304, the system logs a date and time the information was reviewed, approved, rejected, etc., the identity of the reviewer including whether the review was by a human administrator or automated process and the IP address of the reviewer. If the system is configured to allow administrators to edit content, beyond standard redactions, then the system also logs any such edits including a time of the edit, the identity of the administrator responsible for the edits, and the content both before and after the edits. With respect to the dissemination of approved content at step 310, the system logs who received the content, the date and time the content was read or viewed by the recipient, the identity and status of the submitter, the list of intended recipients, and the IP address of the recipient.

Figure 4:
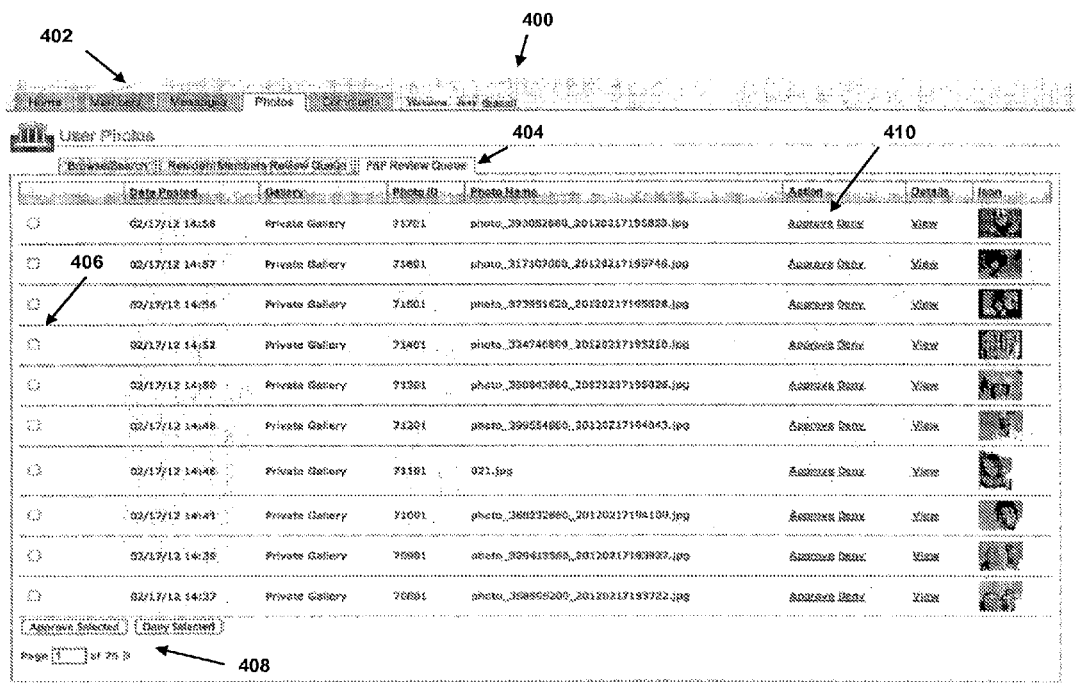
FIG. 4 illustrates an example of an administrative screen used in the approval process.

FIG. 4 shows an example of a screen 400 that an administrator might see when logged into the system to review submitted content. The screen 400 includes a number of tabs 402. Each of the tabs 402 allows the administrator to access different information or to organize information in different logical arrangements. A second set of tabs 404 allows the administrator further control over the information to be displayed. In this example the "photos" tab has been selected from tabs 402, allowing the administrator to review and process image submissions. In the FIG. 4 example, the "F&F Review Queue" tab has been selected from tabs 404. This allows the administrator to see a listing of images that have been submitted by friends and family (or other members outside of the controlled environment, for instance users 105, 106 and 107 in FIG. 1). An action column 410 allows the administrator to approve or deny images on a line by line basis. Check-boxes 406 and action buttons 408 allow the administrator to batch process content. It should be appreciated that illustrated screens, such as screen 400, are shown as examples only and should not be construed as limiting the invention. The system utilizes a number of screens, but only a subset are discussed herein to highlight the functionality of the different embodiments.

In addition to the approval process shown in FIG. 4, it is also possible to provide requests for approval to an administrator's mobile device. In this arrangement, a request to approve content would be forwarded from the system to one or more administrators. The administrator(s) can then view the request, and if necessary the submitted content, on a mobile device from which they can then approve or reject the submission. This alleviates the need for an administrator to separately log into the system via a workstation or other less portable device and ensures prompt notification and review of requests.

Figure 5:
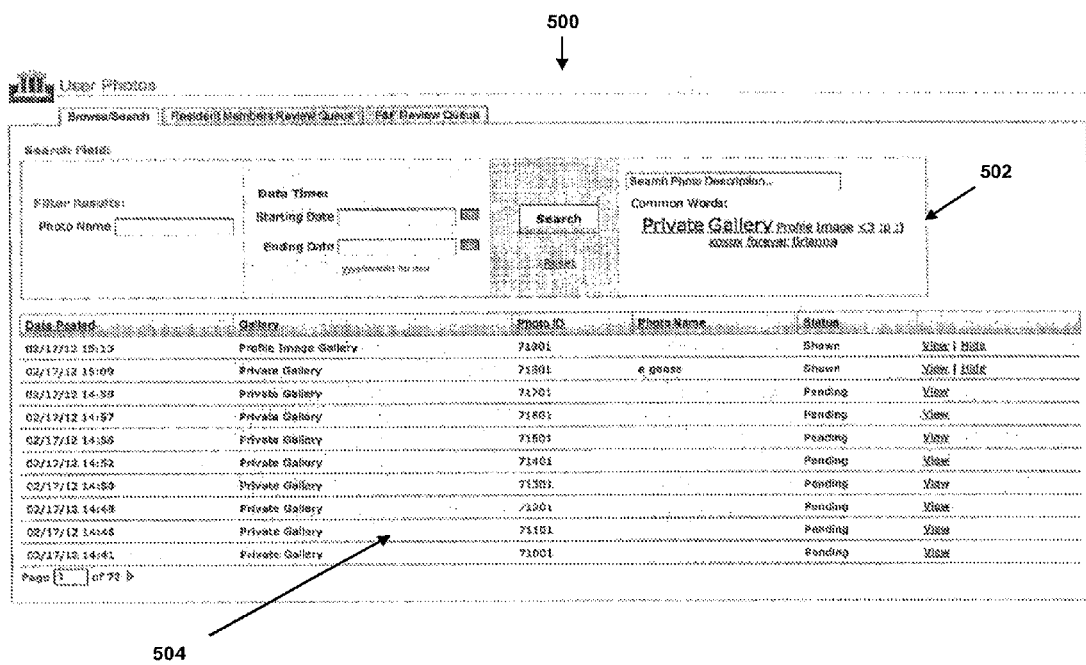
FIG. 5 illustrates an example of an administrative screen used in reviewing content.

FIG. 5 shows an example of another screen 500 for use by an administrator of the system. Here the administrator has selected the "browse/search" tab from tabs 404 (shown in FIG. 4). Rather than providing for approval/rejection of content, this screen allows an administrator to view and search for content. Screen 500 includes a search bar 502 from which an administrator can enter search or filter criteria. The criteria can include, but is not limited to, image or file names, ranges of posting dates, or text within a description or caption for an image. A content area 504 shows a list of images or content matching the entered search Criteria. Links are also provided to allow the administrator to view the submitted images.

Figure 6:
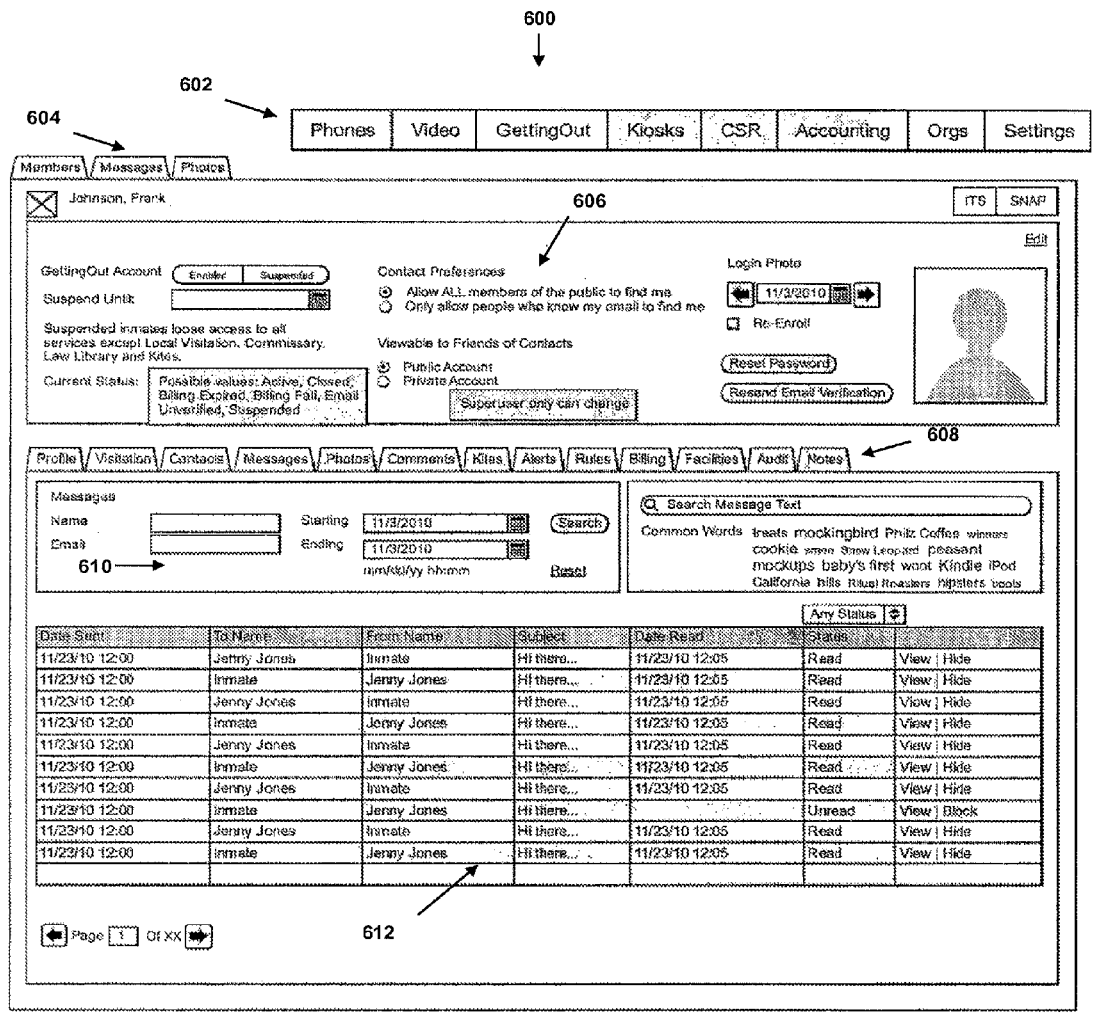
FIG. 6 illustrates an example of an administrative screen used in reviewing messages related to a user.

FIG. 6 shows an example of a different screen 600 for use by an administrator. Screen 600 includes a set of tabs 602 that allows the administrator to access and control different systems. The tabs 602 of screen 600 provide access to systems beyond the social network system. This screen 600 serves as a centralized administrator interface for a number of computerized data systems. Having selected the social network tab (shown as the "GettingOut" tab of tabs 602), the administrator is presented with a second set of tabs 604. Tabs 604 allow the administrator to organize the information by member profile or content (such as messages or photos). Having selected the "Members" tab, the administrator can then select a specific member to view the details of his/her profile and interactions. A member control bar 606 allows the administrator to control the various security settings on the member's account. A third set of tabs 608 provides the administrator with access to different content related to the particular member. In the illustrated example, the administrator has selected the "Messages" tab. Here, similar to FIG. 5, the administrator has a search bar 610 and a content area 612 to show the results of a search or filter operation.

Figure 7:
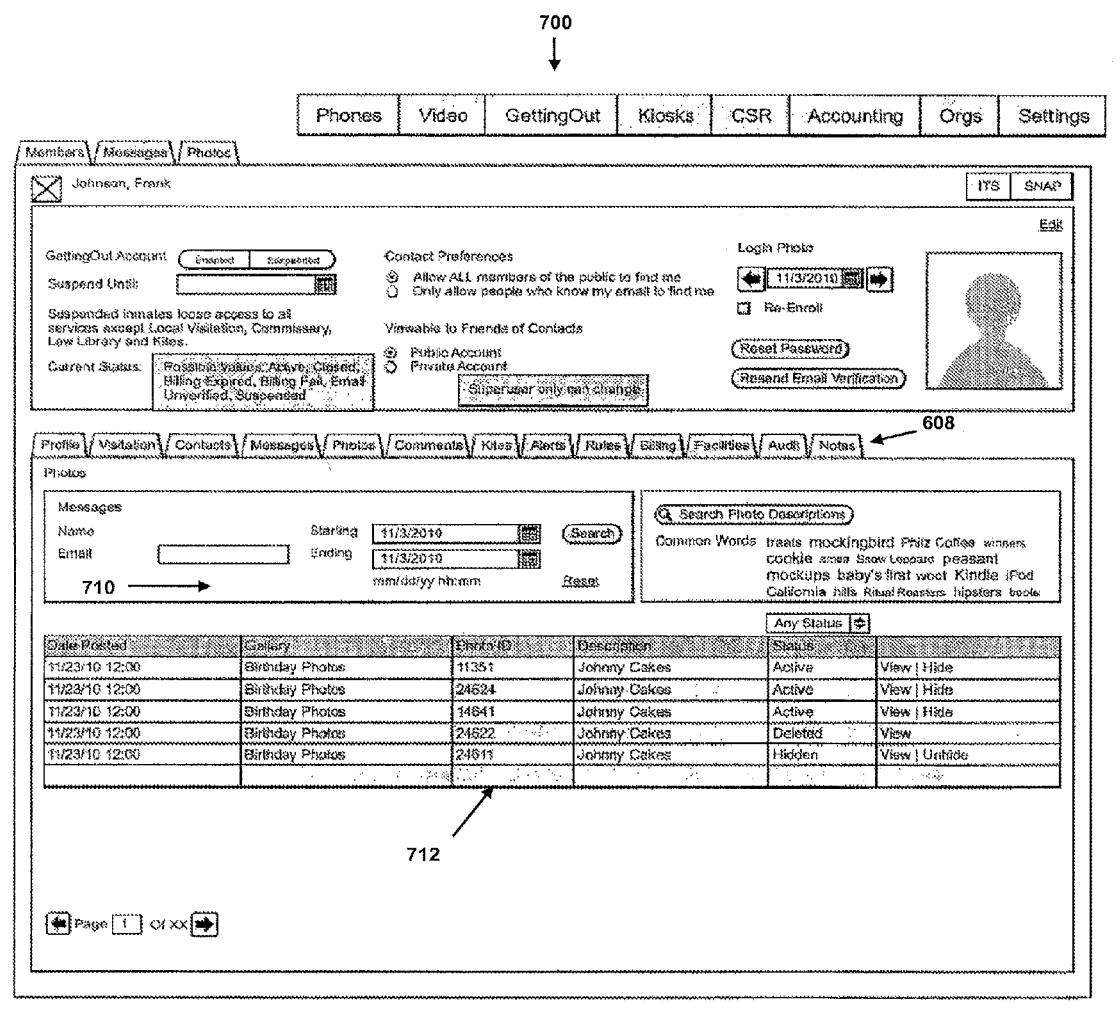

FIG. 7 shows an example of another screen 700 for use by an administrator. Screen 700 is similar to screen 600, except here the administrator has selected the "Photos" tab from tabs 608. Once again, a search bar 710 is available for searching and filtering results, and a content area 712 shows the results of the search or filter operation.

Figure 8:
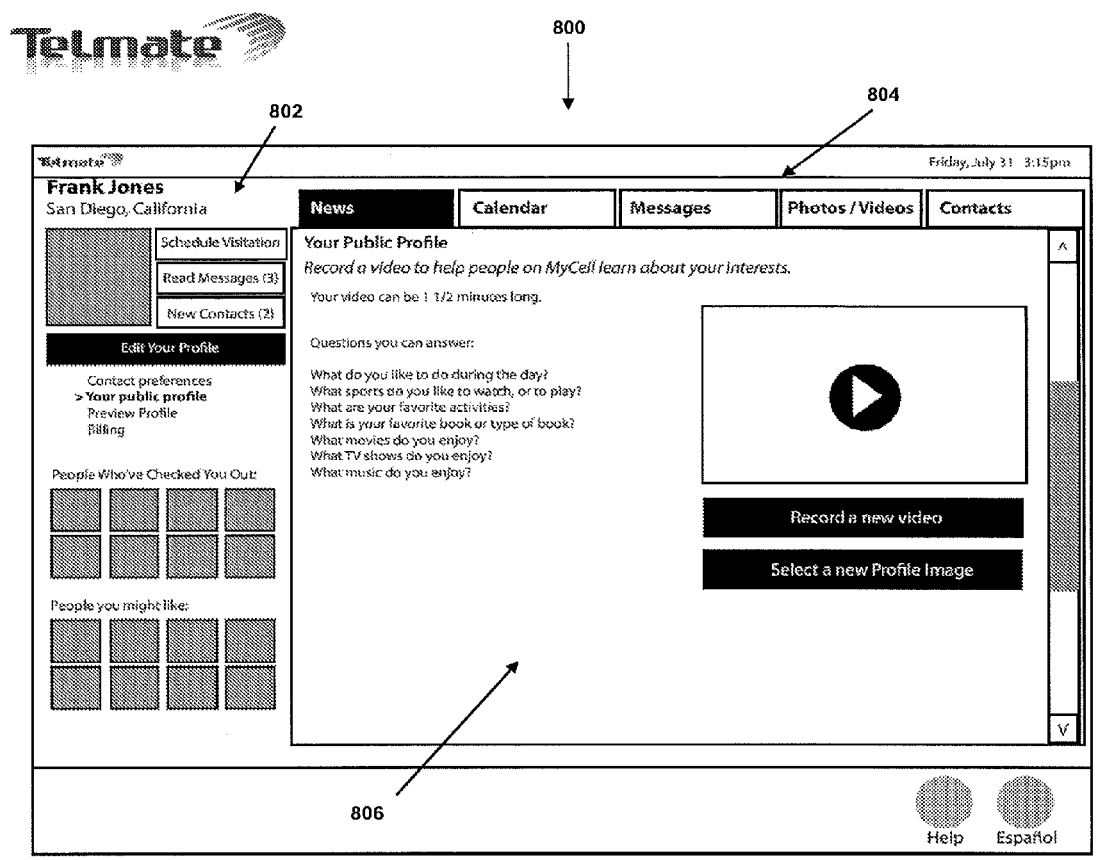
FIG. 8 illustrates an example of a user's interface screen.

FIG. 8 shows an example of a member screen 800. Member screen 800 includes a member information area 802. This area 802 includes the member's current profile image, and shows recent or suggested contacts. Member information area 802 also includes a number of shortcuts to view new messages, schedule visitations, and view new contacts. The area also includes links to account details such as billing and profile preferences. A set of tabs 804 allows the member to navigate posted content and submit his/her own content. A content area 806 displays information to the member based on the selected tab.

Figure 9:
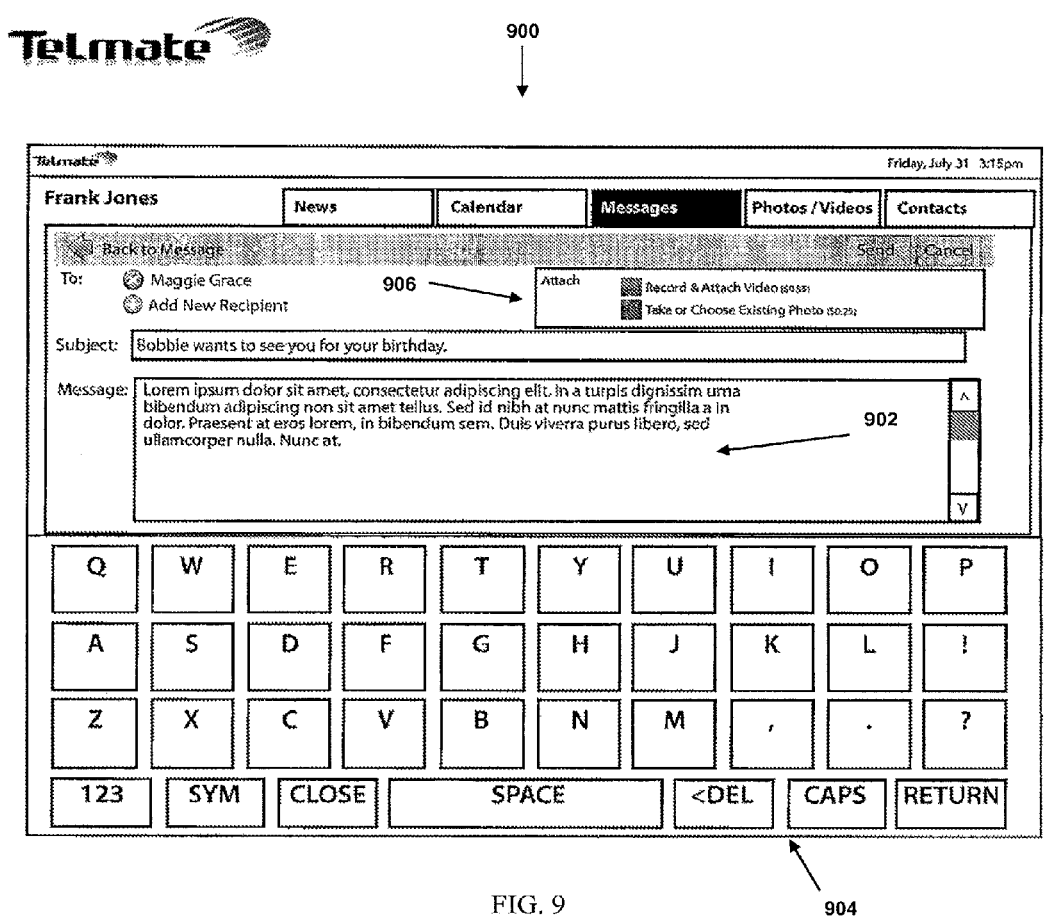
FIG. 9 illustrates an example of a user's interface during message composition.

FIG. 9 shows an example of a screen 900 used by a user to compose a message. Screen 900 includes a message box 902 in which the member can enter the content he wishes to send. The member can also select and delete recipients. An attachment bar 906 allows the member to attach images or videos to the message; existing files can be attached and new files generated via a camera installed in the device (such as a webcam), or a camera installed in a kiosk arrangement can also be attached. Screen 900 also includes a keyboard 904 for use in touch screen devices or other devices that do not employ traditional keyboards.

Figure 10:
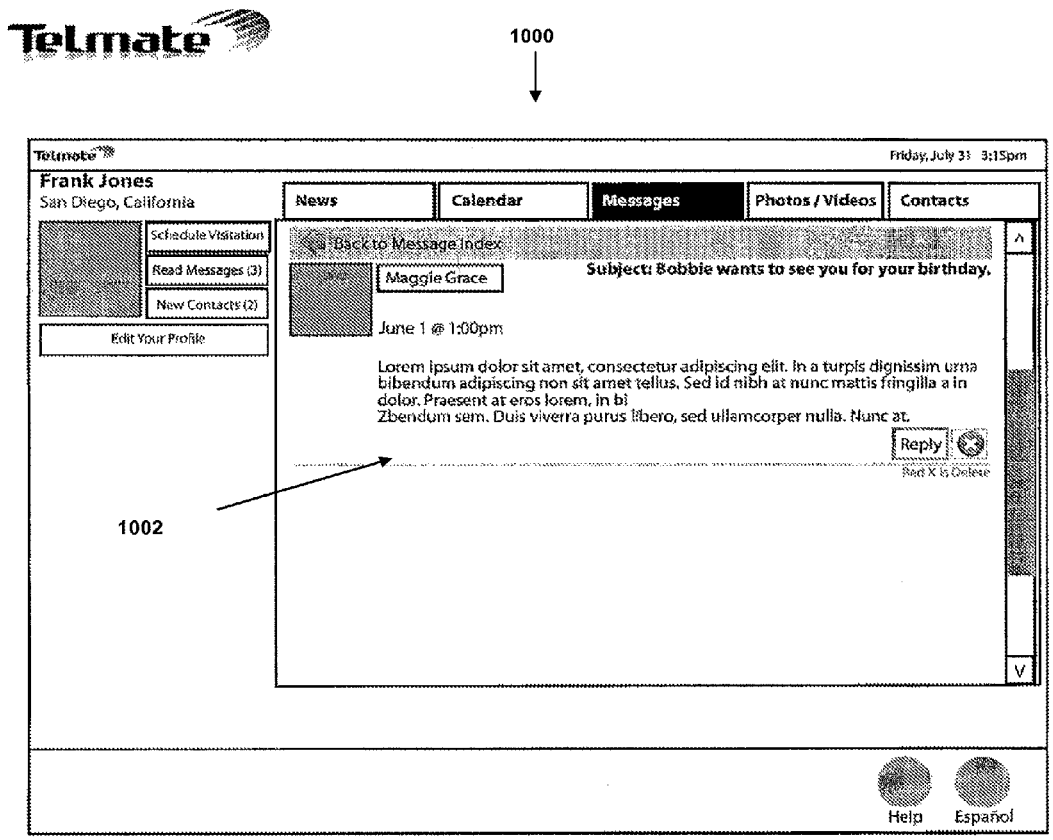
FIG. 10 illustrates an example of a user's interface when reviewing a received message.

FIG. 10 shows an example of a user screen 1000 being used to review a received message. In this instance, the user has Selected a specific message from a message index (not shown), which is then displayed in content area 1002. From content area 1002 the user can review the content of the message, delete the message, and/or choose to reply to the message.

Figure 11:
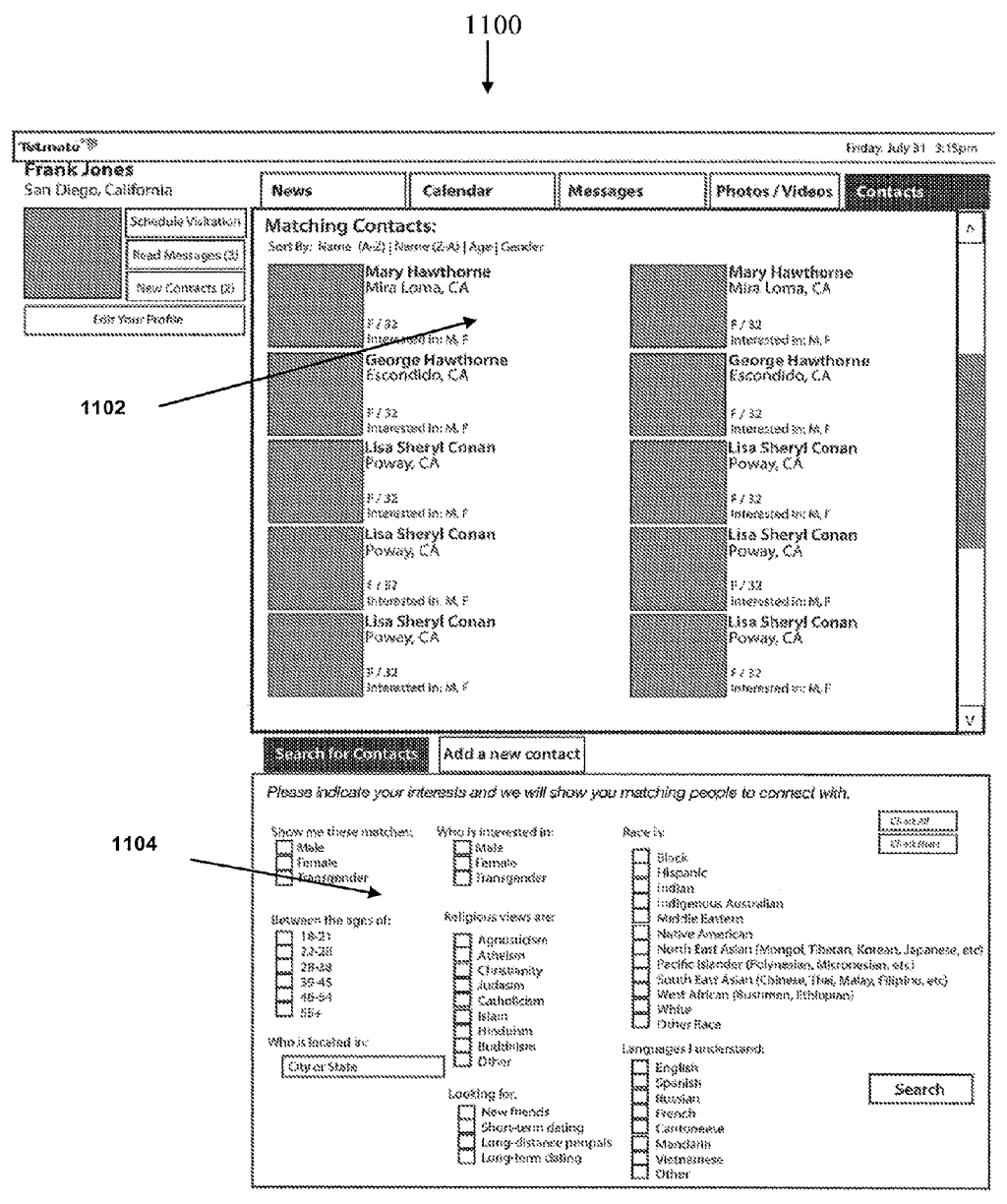

FIG. 11 shows an example of a user screen 1100 used to search for new contacts. This screen is used by members who wish to find other members and add them to their social network. In this instance, the member has selected the "contacts" tab from tabs 804 (see FIG. 8). A lower search area 1104 allows the member to identify search criteria via a number of check boxes or text fields. Search criteria can include any number of member characteristics provided by the member, administrator(s) or connected databases, such as profession, religion, relationship status, sexual preference, level of education, interests, relationship goals, race, languages, etc. Having entered search criteria in area 1104 and activated the search button, the member is presented with search results in area 1102. Area 1102 shows basic member information for members meeting the search criteria and allows the member to sort the matches by various criteria and request to be added to one or more particular members' social network(s).

The features of screen 1100 enable the system to be used for dating, professional networking, pen pal matching etc. The features also allow a member to identify other members with particular characteristics although the searching member may not know the individual. The search criteria available in area 1104 and the level of information provided in area 1102 can be tailored for specific settings or members. This allows administrators to ensure the required level of security. For instance, detainees may be given limited or no search privileges while outside members may be given much broader searching options. Privacy options can also be set by members to limit access by other members, but not by administrators or investigators. Also, search privileges can be tailored for specific members, for instance blocking all member search capabilities for a particular member or preventing a specific individual from coming up in a result list for a particular member.

Figure 12:
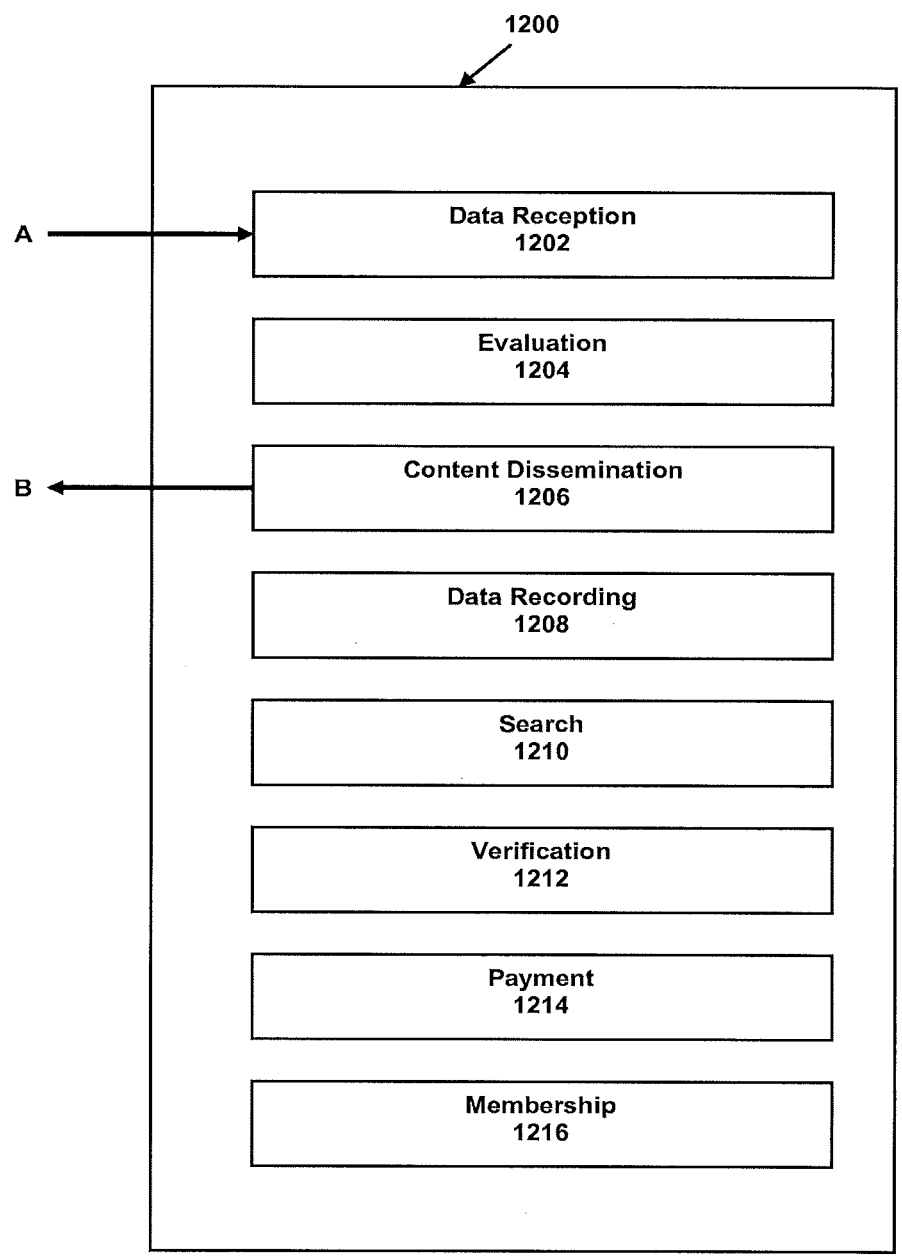
FIG. 12 illustrates a system according to the present disclosure.

FIG. 12 shows an exemplary system 1200 that carries out the various functionalities disclosed herein. System 1200 includes a data reception module 1202 that receives content for display to intended members of the social network in an electronic form from a user as indicated by the arrow labeled "A". The system 1200 also includes an evaluation module 1204 that evaluates received content and determines if the content is appropriate for display to the members or intended members of the social network or if other action should be taken with respect to the content. The evaluation module 1204 can provide interaction with administrators, but can also implement automated evaluation processes. The system 1200 further includes a content dissemination module 1206 that provides received content, that has been deemed appropriate by the evaluation module 1204, to the intended members of the social network (for viewing).

The system 1200 also includes a data recording module 1208 that logs data relative to the actions of the other modules. Data recording module can carry out all of the logging functions discussed herein including submission logging, dissemination logging, administrative review logging, and logging of any administrative edits or other actions. A search module 1210 is also included and can receive search criteria and generate a report from the data recorded by the data recording module 1208 based on the received search criteria. The system 1200 further includes a verification module 1212 that can gather data such as a user name, a password, a facial image, identifying body marks or features image(s), a voice sample, a retinal scan or a finger or palm print and compare the data to stored information to confirm or deny a member's identity. A payment module 1214 allows the system 1200 to calculate fees and charge members, administrators or third parties for their usage of the system 1200. The payment module 1214 determines fees based on one or more of a flat rate, the quantity of information submitted, received, viewed or stored, the type of information, the time of day, the day of the week, the number of connections, the length of time of a connection, the type of device used, the, member type, or the status of the member within or as a member of a controlled environment. The system 1200 also includes a membership module 1216 that allows administrators to modify the social network of a given member by adding or deleting members. Membership module 1216 also facilitates the enrollment and approval of new members when an individual first generates a profile and becomes a member of the system.

Each of the modules 1202-1216 of system 1200 are interconnected and can share information with one another. Also, while each module is shown as separate, various modules could be combined or split into separate submodules. Each module can be implemented as hardware, software, or a combination of hardware and software. Preferably the modules are implemented as software running on a server or other computing device.

The above description and drawings are only to be considered illustrative of specific embodiments, which achieve the features and advantages describe herein. Modifications and substitutions for specific conditions and materials can be made. Accordingly, the embodiments are not considered as being limited by the foregoing description and drawings, but are only limited by the scope of the appended claims.

We claim:

1. An apparatus for facilitating the controlled exchange of information between users of a social network utilizing a stored policy pertaining to individual users that includes at least two facility resident users subject to limitations of a controlled facility, the apparatus comprising:

at least one processor;
at least one network interface;
a memory;
a software application, physically stored in the memory, comprising instructions operable to cause the at least one processor and the apparatus to:
add and delete members to the social network by an administrator based on a policy stored in the memory pertaining to individual social network users that specifies authorized and unauthorized contacts for a given user, unauthorized content for a given user, and key words assigned to a given user that are used for flagging submitted content for investigation;
receive content submitted by a social network user in an electronic form, the received content for display to the users of the social network, wherein the users of the social network includes at least the at least two facility resident users when the content is from a non-facility resident user of the social network, and wherein the users of the social network includes at least two non-facility resident users of the social network, outside of the controlled facility, when the content is from a facility resident user;
semi-automatically evaluate the received content to determine if it is appropriate for display to the users of the social network wherein the semi-automatically evaluate includes automatically determining the received content to be appropriate when pre-defined parameters are met based on the policy for the user stored in the memory, wherein the pre-defined parameters include authenticating user identity, determining whether submitting user and recipient are within the controlled facility, determining whether exchange of information with recipient is authorized, determining whether subject matter of submitted content is authorized, and flagging key words in the submitted content for investigation,
wherein when it is determined that the received content does not meet the pre-defined parameters, the instructions operable to cause the at least one processor and the apparatus to semi-automatically evaluate the received content further comprises automatically redact unauthorized subject matter and optionally flag the received content that does not meet pre-defined parameters for further review or editing by a human administrator using a computer or other digital-enabled device;
provide the received content that is evaluated as appropriate to be viewed by the users of the social network; and
record data relative to at least one of receiving the content, evaluating the content, or providing the content to be viewed.

2. The apparatus as recited in claim 1, wherein the content includes one or more of text, image, video or audio data.

3. The apparatus as recited in claim 1, further comprising the instructions operable to cause the at least one processor and the apparatus to:
verify an identity of a user transmitting the content prior to receiving the content.

4. The apparatus as recited in claim 3, wherein the instructions operable to cause the at least one processor and the apparatus to verify the identity includes collecting one or more of a user name, a password, a facial image, an identifying body mark or features image, a voice sample, a retinal scan or a palm or fingerprint.

5. The apparatus as recited in claim 4, wherein the collected data is compared to stored information to verify the user's identity.

6. The apparatus as recited in claim 4, wherein the user is required to periodically update one or more of the user name, the password, facial image, identifying body mark or feature image, voice sample, retinal scan or palm or fingerprint to ensure the stored information is current.

7. The apparatus as recited in claim 1, wherein the content that is evaluated as appropriate is displayed to the one or more members of the social network in an arrangement that is sorted by one of chronological order, alphabetical order, content submitter, or content type.

8. The apparatus as recited in claim 1, further comprising the instructions operable to cause the at least one processor and the apparatus to:
charge individual users a fee for receiving, submitting, reviewing or storing content.

9. The apparatus as recited in claim 8, wherein the fee is determined based on one or more of a flat rate, the quantity of information submitted, received, viewed or stored, the type of information, the time of day, the day of the week, the number of connections, the length of time of a connection, the type of device used, the member type, or the status of the user within or as a member of a controlled environment.

10. The apparatus as recited in claim 1, wherein the instructions operable to cause the at least one processor and the apparatus to evaluate the content further comprises:
display the received content to an administrator in a list that is sorted by one of chronological order, alphabetical order, content submitter, or content types; and
inputting an indication of the appropriateness of the content.

11. The apparatus as recited in claim 1, further comprising the instructions operable to cause the at least one processor and the apparatus to:
receive search criteria; and
generate a report based on the recorded data and the received search criteria.

12. The apparatus as recited in claim 1, further comprising the instructions operable to cause the at least one processor and the apparatus to:
receive one or more member characteristic criteria; and
display a list of members matching the member characteristic criteria.

13. The apparatus as recited in claim 12, wherein the member characteristic criteria are configured to facilitate dating, professional networking, pen-pal matching or common interest matching.

14. The apparatus as recited in claim 1, further comprising the instructions operable to cause the at least one processor and the apparatus to:
receive input from an administrator; and
add, delete, suspend, block, punish or penalize members from the social network based on the received input.

15. The apparatus as recited in claim 1 wherein the one or more member-specific parameters comprises at least one of user identity potentially accessing the received content, if a user is a resident facility user, submitted content user identity in relation to the user identity potentially accessing the received content and a type of content in relation to the user identity potentially accessing the received content.

16. A non-transitory tangible computer-readable medium for facilitating the controlled exchange of information between users of a social network utilizing a stored policy pertaining to individual users that includes at least two facility resident users subject to limitations of a controlled facility, comprising executable instructions operative to cause one or more processors to:
    add and delete members to the social network by an administrator based on a policy stored in the memory pertaining to individual social network users that specifies authorized and unauthorized contacts for a given user, unauthorized content for a given user, and key words assigned to a given user that are used for flagging submitted content for investigation;
    receive content submitted by a social network user in an electronic form, the received content for display to the users of the social network wherein the users of the social network includes at least the at least two facility resident users when the content is from a non-facility resident user of the social network, and wherein the users of the social network includes at least two non-facility resident users of the social network, outside of the controlled facility, when the content is from a facility resident user;
    semi-automatically evaluate the received content to determine if it is appropriate for display to the users of the social network wherein the semi-automatically evaluate includes automatically determining the received content to be appropriate when pre-defined parameters are met based on the policy for the user stored in the memory, wherein the pre-defined parameters include authenticating user identity, determining whether submitting user and recipient are within the controlled facility, determining whether exchange of information with recipient is authorized, determining whether subject matter of submitted content is authorized, and flagging key words in the submitted content for investigation,
    wherein when it is determined that the received content does not meet the pre-defined parameters, the instructions operable to cause the one or more processors to semi-automatically evaluate the received content further comprises automatically redact unauthorized subject matter and optionally flag the received content that does not meet pre-defined parameters for further review or editing by a human administrator using a computer or other digital-enabled device;
    provide the received content that is evaluated as appropriate to be viewed by the users of the social network; and
    record data relative to at least one of receiving the content, evaluating the content, or providing the content to be viewed.

17. The non-transitory tangible computer-readable medium as recited in claim 16 further comprising instructions operable to cause the one or more processors to:
    verify an identity of a user transmitting the content prior to receiving the content.

18. The non-transitory tangible computer-readable medium as recited in claim 16, wherein the instructions operable to cause the one or more processors to verify the identity includes collect one or more of a user name, a password, a facial image, an identifying body mark or features image, a voice sample, a retinal scan or a palm or fingerprint.

19. The non-transitory tangible computer-readable medium as recited in claim 18, wherein the collected data is compared to stored information to verify the user's identity.

20. The non-transitory tangible computer-readable medium as recited in claim 16, further comprising instructions operable to cause the one or more processors to:
    receive input from an administrator; and
    add, delete, suspend, block, punish or penalize members from the social network based on the received input.

* * * * *